Dec. 6, 1955  S. M. HAMMER  2,726,377
REMOTE CONTROL FOR PUMPING STATIONS
Filed Oct. 28, 1952  2 Sheets-Sheet 1
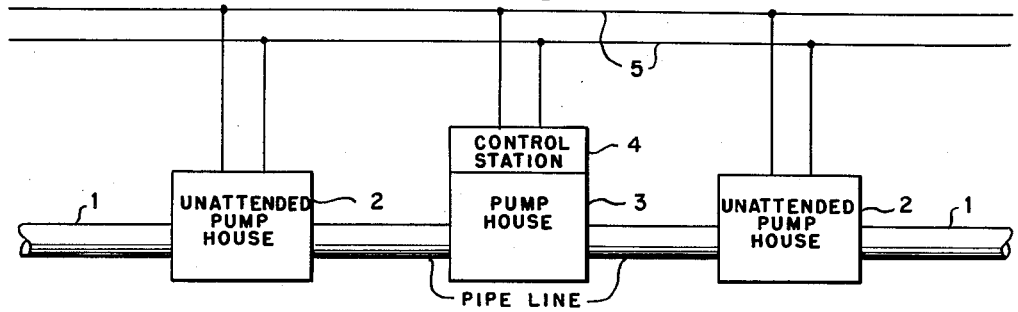
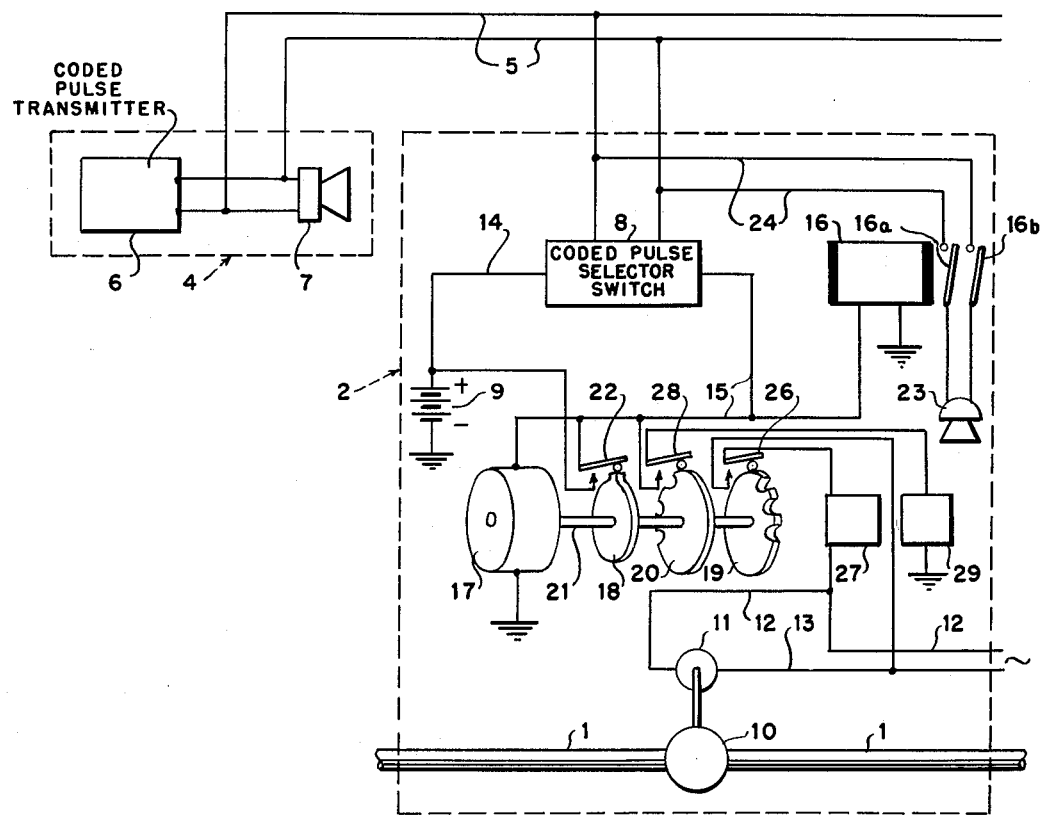
INVENTOR.
Sigwald M. Hammer
BY
Adams Forward & McLean
ATTORNEYS United States Patent Office 2,726,377
Patented Dec. 6, 1955

2,726,377

REMOTE CONTROL FOR PUMPING STATIONS

Sigwald M. Hammer, Independence, Kans.

Application October 28, 1952, Serial No. 317,234

2 Claims. (Cl. 340—163)

My invention relates to the remote monitoring and control of petroleum or petroleum products pipe line pump houses. My invention, in particular, is a monitoring system adapted to be operated through a party line-type telephone system which connects a series of pump houses along a pipe line carrying petroleum products. The monitoring system of my invention is adapted to be controlled at a station geographically separated from each pump house to be monitored. Each monitored pump house, moreover, may be independently selected and controlled by the control station excluding other pump houses located along the same party telephone line and without interfering with their operation. The remote control and and monitoring system of my invention is designed to transmit intelligence concerning operation of the selected pump house and also to control such operation.

Pipe lines for petroleum or petroleum products are operated by a series of pump houses located along the pipe line at intervals determined by the size of pumping equipment and the pipe line capacity. Gathering lines are employed to feed gathered oil into the trunk lines from gathering pump stations which are normally unattended. The customary method of operation at the gathering points is that a field gauger visits the pump houses at the gathering points in his district each morning, determines the amount of oil gathered and which is to be pumped and starts the pump motor which then runs under control of a clock time switch set to stop the motor after a number of hours determined by capacity of the pump and the amount of gathered oil in the tank. Control stations are employed to coordinate the operation of groups of successive pump houses along the pipe line at gathering points. Each control station customarily communicates with each of the pump houses under its control by means of a two-wire party telephone line connected with each of the pump houses in the control group. Each pump house is assigned a coded ringing number so that the control station can "ring up" whichever pump house it wishes to communicate with.

The principal object of my invention is to monitor and control small, normally unattended pump stations, such as on gathering lines, so that the dispatcher at the control point may have complete control, particularly during the time when the gauger is away from the stations. I particularly desire to accomplish this object using existing telephone lines, and hence the following limitations must be observed:

(1) Each pump house to be monitored and controlled should be individually selectable, (2) The transmitted intelligence concerning the selected pump house should include a positive identification of the pump house, whether the pump is operating and whether the power to the pump motor is on, (3) No additional communication lines should be required between the control station and its associated pump houses, (4) Required extra equipment should be installed only at each pump house to be controlled, (5) The duration of the control period within which the monitoring and control system is connected to the telephone line should be limited, and (6) The monitoring and control system should not tie up the telephone line when in operation so that emergency calls may be made and so that, if the equipment should fail while connected to the line, other stations may still be contacted.

I have found that in the unique case of pump houses the transmission of operational intelligence in the form of sounds produced by the operating equipment in the pump house conveys to a person capable of interpreting such intelligence the operating status of the monitored station. This audible intelligence is preferable to intelligence conveyed in the form of lighted lamps and the like, since pumps and pump motors emit sounds of a singularly intelligible character. Audible intelligence, moreover, can be transmitted over a two-wire telephone line with a minimum of equipment whereas other systems, such as the use of banks of lighted lamps, require either additional communication lines or highly complicated instruments to transmit the intelligence over a two-wire system and highly complicated instruments located at the control station to interpret such intelligence.

The operation of the monitoring system of my invention will be more readily explained by reference to the appended drawings. The drawings, however, are merely illustrative and are not to be considered as limiting the applicability of my invention.

Figure 1 is a diagrammatic view of a section of a pipe line for petroleum or petroleum products, including three pump houses and a control station, to which the system of my invention is applicable.

Figure 2 is a diagrammatic electrical circuit of a remote monitoring and control system according to my invention including a control station and an unattended pump house servicing a pipe line for petroleum or petroleum products.

Figure 3:
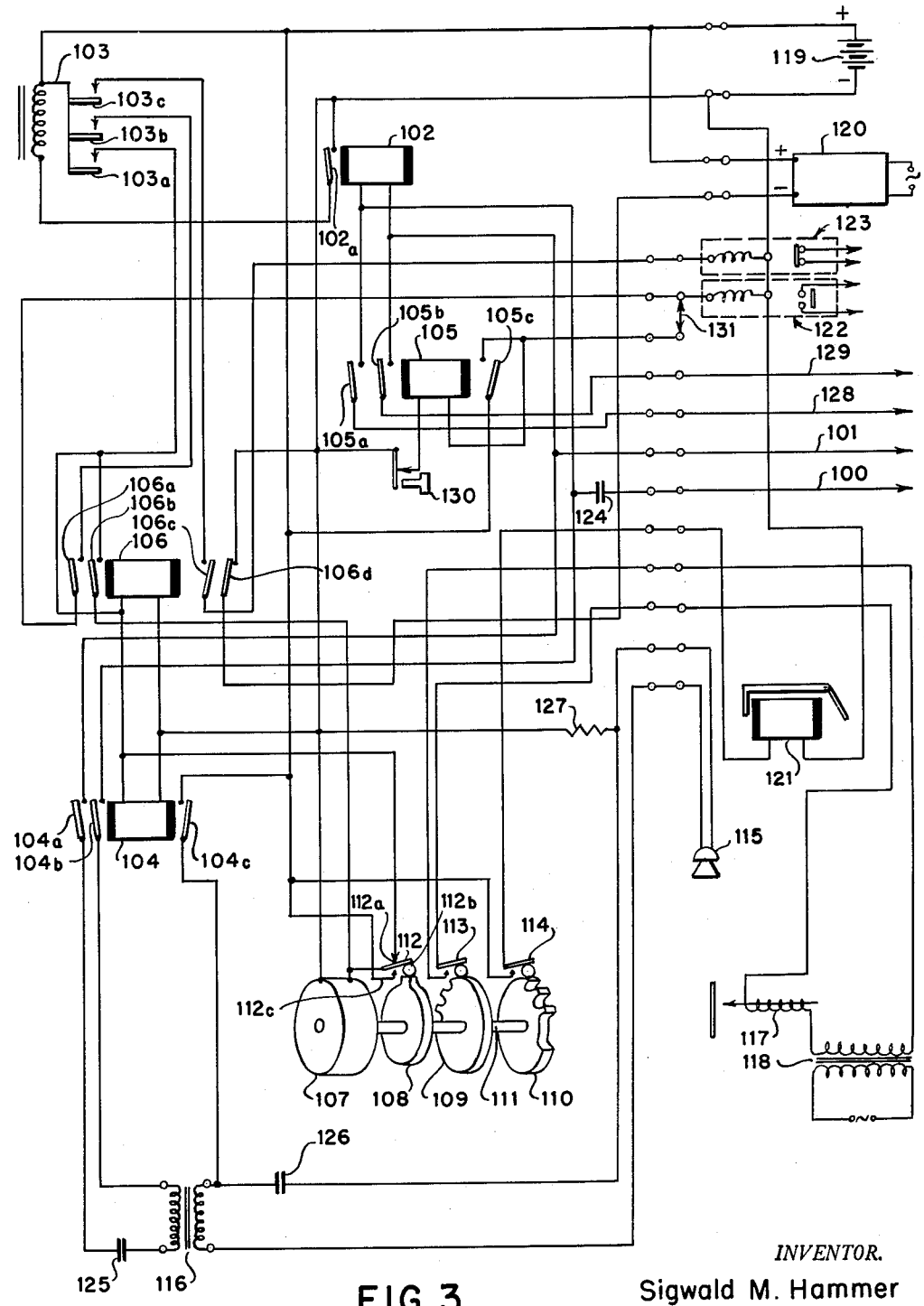
Figure 3 is a schematic electrical circuit diagram of the equipment to be installed at an unattended pump house and connected to the telephone line in order to provide monitoring and control operation according to my invention.

In Figure 1 the reference numeral 1 indicates a section of petroleum or petroleum products pipe line. Pump houses 2 are unattended while pump house 3 is operated by the personnel of control station 4. Alternatively pump house 3 may be also operated in the same manner as unattended pump houses 2. A two-wire telephone line 5 is connected to each of the unattended pump houses and to the control station by a conventional party line system over which signals transmitted convey operational intelligence according to the system of my invention.

Figure 2 of the drawings show in a generally diagrammatic manner the operation of the remote control and monitoring system of my invention as it is applied to a pipe line such as is shown in Figure 1. Control station 4 and one unattended pump house 2 are indicated in dashed lines.

Referring more specifically to control station 4, it will be seen that the station is provided with coded pulse transmitter 6 and receiver 7 for audible signals, each connected to telephone lines 5. While Figure 2 shows receiver 7 and transmitter 6 connected in parallel with telephone lines 5, it will be noted that additional components are employed to energize the line when in use and to disconnect receiver 7 when coded pulse transmitter 6 is sending pulses of current into line 5.

Referring to unattended pump house 2 in Figure 2 it will be seen that coded pulse selector switch 8 is connected across telephone line 5. Coded pulse selector switch 8 is a switch operable to establish one or more momentary circuit closures in response to preselected groups of coded pulses.

A battery 9 supplies the operating potential for coded pulse selector switch 8 and its associated relay 16 and timer motor 17. Pump 10 connected in pipe line 1 is driven by motor 11 powered by an independent alternating current source (not shown) which is connected to motor 11 by lines 12 and 13.

Coded pulse selector switch 8 is connected to establish a selectable circuit closure between line 14 connected to the positive side of battery 9 and line 15 in response to a preselected coded pulse group transmitted over line 5. Line 15 is connected to energize relay 16 and timer motor 17.

Timer motor 17 rotates cam 18, 19 and 20 mounted on cam shaft 21. Each of cams 18, 19 and 20 operates a separate single throw, single pole switch which is normally open. Switch 22, operated by cam 18, shunts the selectable circuit closure of coded pulse selector switch 8. The cam is cut with a profile such that there is only one point in its cycle of rotation in which switch 22 is opened, this being the normal position of rest. Thus, when coded pulse selector switch 8 momentarily energizes motor 17 in response to a pulse group of the proper code, the initial rotation of motor 17 turns cam 18 to operate switch 22 and shunt the momentary circuit closure established by coded pulse selector switch 8. This action "locks-in" the operation of timer motor 17 for one cycle of cam 18. The speed of motor 17 is regulated through a worm drive or the like to provide an operating cycle of approximately a minute.

Relay 16 is also energized by the momentary closure of coded pulse selector switch 8 which is then shunted by switch 22 for the operating cycle of cam 18. Normally open, single pole, single throw switches 16a and 16b mounted on relay 16 connect telephone transmitter 23 to telephone line 5 by means of connecting lines 24 when relay 16 is energized. Transmitter 23 is disposed to pick up the sounds of pump motor 11 and pump 10 operation as well as the sounds of operations of other devices located within the pump house which are hereinafter described.

Cam 19 on cam shaft 21 drives normally open, single pole, single throw switch 26. The profile of cam 19 is cut to operate switch 26 only during the latter part of the cycle of operation of cam 19 and then in a series of makes and breaks. Switch 26 is connected to establish a circuit closure between alternating current power lines 12 and 13 which includes chime 27. Thus, during the latter part of the cycle of operation of timer motor 17, and hence cam 19, chime 27 is actuated periodically if the pump motor power supply is energized.

The third cam driven by timer motor 17, cam 20, has its profile cut to close normally open, single pole, single throw switch 28 during the first part of the cycle of operation of cam 20 according to a predetermined code. Switch 28 establishes a circuit closure between line 15 and the negative side of battery 9 (ground) which includes buzzer 29.

In the operation of the device shown in Figure 2 an operator at control station 4 desiring to select unattended pump station 2 transmits the proper code groupings of pulses over line 5 by means of code transmitter 6. Coded pulse selector switch 8 in response to the transmitted coded pulses establishes a momentary circuit closure from the positive side of battery 9 to relay 16 and timer motor 17, causing each to be energized. The operation of switches 16a and 16b by relay 16 connects telephone transmitter 23 into line 5 thus permitting the operator at control station 4 to receive audible intelligence concerning the operation at unattended pump house 2. The rotation of timer motor 17, by means of cam 18 and switch 22 "locks-in" relay 16 and timer motor 17 for the cycle of operation of timer motor 17. Timer motor 17, by means of cam operated switch 28, actuates buzzer 29 with a coded group of sounds determined by the profile of cam 20 which, when transmitted to control station 4 by means of transmitter 23, telephone line 5 and receiver 7, indicate that the proper unattended pump house 2 has been selected. Cam driven switch 26 then indicates by closing the circuit including chimes 27 that the pump motor power supply is energized.

Figure 3 is a schematic electrical wiring diagram of the essential equipment required at a single unattended pump house in order to monitor and control the pump house over the party line telephone line according to the principles of my invention.

Relay 102 is responsive to signals of the duration transmitted by coded pulse transmitter 6 located in control station 4 (shown in Figure 2) to actuate single pole, single throw, normally open switch 102a. Selector switch 103 is an electro-mechanical switch arranged to receive three codes progressively actuating contacts 103a, 103b and 103c, respectively. I prefer to use a commercially available instrument known as the Secode Selector Type 48W–C, which includes relay 102 and its associated switch 102a. This switch is responsive to pulses of a twenty cycle ringing circuit such as produced by a ringing machine or by a hand cranked generator in a magneto telephone. Relays 104 and 105 are each adapted to actuate three single pole, single throw, normally open switches 104a, 104b and 104c, and 105a, 105b, and 105c, respectively. Relay 106 is adapted to actuate three single pole, single throw, normally open switches 106a, 106b, and 106c and one single pole, single throw, normally closed switch 106d.

Timer motor 107 is suitably a constant speed motor geared to a slow rate of speed, e. g., one revolution per minute. Timer motor 107 drives three cams 108, 109 and 110 mounted on cam shaft 111. Cam 108 operates single pole, double throw switch 112 and cams 109 and 110 operate single pole, single throw, normally open switches 113 and 114, respectively. The profile of cam 108 is cut so that in one cycle of operation contacts 112b and 112c of switch 112 remain closed for the entire period of the cycle with the exception of the normal rest point of cam 108 at which contacts 112a and 112b are closed. The profile of cam 109 operates to close switch 113 only during the latter portion of the cycle of operation of motor 107. The profile of cam 109 is further designed so that switch 113 makes and breaks contact periodically during the latter portion of the cycle. The profile of cam 110 operates to close switch 114 during the first portion of the cycle of operation of motor 107 for several brief intervals of short duration spaced to represent a preselected coded grouping.

The principal operating components also include a telephone type transmitter 115 and its associated transformer 116, a chime producing device 117 and its power supply transformer 118 connected to the A. C. power supply for pump motor 11 (Figure 2), a battery 119, a rectifier 120, a buzzer 121, and motor start and stop relays 122 and 123, respectively, which are included in the circuit powering pump motor 11 (shown in Figure 2).

Telephone lines 100 and 101 are externally connected to telephone lines 5 (shown in Figure 2) and are connected internally to the energizing coil of relay 102. Condenser 124 is inserted in line 100 in order to insure isolation of the operating circuit from main telephone lines 5 and to prevent shorting of main telephone lines 5 in the event of equipment failure. Switch 102a operates to establish a circuit closure completing a circuit which includes the operating solenoids of selector switch 103 and battery 119.

Contact 103a of selector switch 103 establishes a circuit closure between the positive and negative terminals of battery 119 which includes relays 104 and 106, in parallel, and includes motor 107 through closed contacts 112a and 112b of switch 112. Contact 103b of selector switch 103 establishes a circuit closure between the positive and negative terminals of battery 119 which includes normally open switch 106a of relay 106 and motor start relay 122. Contact 103c of selector switch 103 establishes a circuit closure between the positive and negative terminals of battery 119 which includes normally open switch 106c of relay 106 and motor stop relay 123.

Switches 104b and 104a of relay 104, when closed by actuation of relay 104, connect lines 100 and 101, respectively, to the secondary winding of transformer 116 through condenser 125. The primary winding of transformer 116 is connected to transmitter 115 through D. C. blocking condenser 126. Switch 104c of relay 104 establishes a circuit closure between the positive and negative terminals of battery 119 which includes decoupling resistor 127, transmitter 115 and the primary winding of transformer 116.

Switch 106b of relay 106 operates to establish a circuit closure between the positive and negative terminals of battery 119 which includes relays 104 and 106, in parallel, and includes motor 107 through contacts 112b and 112c. Switch 106d operates to open a circuit between the positive and negative terminals of battery 119 which includes trickle charging rectifier 120.

Lines 100 and 101 are also connected to switches 105a and 105b, respectively, of relay 105. When relay 105 is actuated, switches 105a and 105b connect lines 100 and 101 with lines 128 and 129, respectively, which lead to a superintendent's office or the like (not shown). Switch 105c of relay 105 operates to establish a circuit closure between the positive and negative terminals of battery 119 which includes relay 105 and normally closed push button switch 130.

Switch 113 is operated by cam 109 to establish a circuit closure in the output circuit of transformer 118 which includes chime 117. Switch 114 is operated by cam 109 to establish a circuit closure between the positive and negative terminals of battery 119 which includes buzzer 121.

Relay 105 is optionally operated in place of motor start relay 122 by strap connection 131 which is made when start relay 122 is not used.

Coded groups of pulses on telephone line 5 energize relay 102, which follows the pulses, and thus energizes selector switch 103. If the pulses are properly coded so as to close the circuit including contact 103a, positive battery voltage is applied to relays 104 and 106, thus energizing them. At the same time, motor 107 is started through switch 112 associated with cam 108.

Switch 112 is thrown to open contacts 112a and 112b to close contacts 112b and 112c by the rotation of cam 108. Since relay 106 has been energized, the positive battery voltage is shunted past selector switch contact 103a to supply the motor 107 and relays 104 and 106 through switch 106b. Thus, relays 104 and 106 "lock-up" and motor 107 continues to run until switch 112 is thrown to its initial position by cam 108 to end the operational cycle.

The energization of relay 104 connects telephone transmitter 115 to telephone lines 5 by the closing of switches 104a and 104b, and powers transmitter 115 by closing switch 104c. This circuit is protected from rectifier 120 "hash" interference since the energization of relay 106 opens switch 106d and disconnects rectifier 120 from battery 119 during the operating cycle of the device.

As motor 107 continues to operate, switch 114 closes following the pattern of the profile of cam 110 to cause buzzer 121 to emit sounds corresponding to a coded grouping identifying the selected pump house. Following the operation of buzzer 121, switch 113 closes periodically to cause chime 117 to ring thus establishing that the pump motor power is on. The cycle ends when cam 108 returns to its initial position, thus deenergizing the circuit including timer motor 107 and relays 104 and 106.

During the operating cycle telephone transmitter 115 picks up any sounds occurring in the pump house. The coded sounds of buzzer 121 immediately identify whether the correct pump house 2 has been selected. The sound of chime 117 indicates whether the pump power supply is on or off. Telephone transmitter 115, moreover, conveys the sound made by pump 10 and its motor 11, if on. Such audible intelligence not only indicates whether the pump is operating, but to the experienced operator indicates whether the pump is operating beyond its normal capacity and similar information.

If the sound of buzzer 121 indicates that the correct pump house has been selected and the sound of chime 117 indicates that the power is on but motor cannot be heard, a second preselected coded signal may be sent to cause selector contact 103b to close. Switch 103b supplies power to motor start relay 122 which is connected to close the circuit to the pump motor and start the pump. If, on the other hand, the sound of the pump indicates that the pump is operating and it is desired to stop the pump, a third group of coded signals selected to close contact 103c of selector switch 103 will similarly actuate the motor stop relay 123. The coded signals, which close contacts 103b and 103c, operate motor start and stop relays 122 and 123, respectively, only during the operational cycle initiated by the coded pulse group which actuates contact 103a since contacts 103b and 103c are connected respectively through switches 106a and 106c which are closed only when relay 106 is energized. Thus, the pump motor at an unselected pump house cannot be accidentally started or stopped by coded pulses on lines 5 which were not intended to be received since the motor start and stop relay circuits cannot be powered until the pump house is selected. It is, therefore, unnecessary to employ different coded groupings from one pump house to another to actuate the motor start or the motor stop relay circuits.

Where the pump motor must be hand started, I connect relay 105 with the motor start relay 122 circuit, controlled by contact 103b of coded selector switch 103, by means of strap 131. Relay 105 "locks-in," once energized, by the closing of switch 105c. Switches 105a and 105b bridge the main telephone lines 5 with separate lines 128 and 129 which run to attending personnel who may be located nearby, such as at a superintendent's office. Relay 105 is not deenergized at the end of the operational cycle in order to prevent interruption of the call. Switch 130 must be opened to disconnect lines 128 and 129. It is, of course, possible to employ a fourth contact on selector switch 103 and another switch on relay 106 or on relay 104 to perform the same operation independently of the circuit including starting relay 122.

It will be noted that a number of unattended pump houses may be monitored and controlled according to the system of my invention employing only a two-wire party telephone connection between them and the control station. It is possible, moreover, to use the same line for communicating with attended pump houses and other locations which do not have the equipment illustrated in Figure 3.

I claim:

1. A control system for a pipe line adapted to transport fluid products having an unattended pump house equipped with a pump connected to said pipe line and driving means for said pump, a source of electric power for said driving means, a source of electric power independent of said pump motor power source, a control station geographically separated from said unattended pump house, and a two-wire telephone system including a two-wire telephone line connecting said control station and said unattended pump house, a coded pulse transmitter and a receiver for signals of audible frequency connected to said telephone line, said transmitter and said receiver being located in said control station, and a transmitter for audible signals located in said unattended pump house;

which control system comprises a first means for location in said unattended pump house and which produces a distinct sound, a second means for location in said unattended pump house and which produces a distinct sound differing from that produced by said first sounding means, a timer mechanism, and a selector means for connection to said telephone line, said selector means being responsive to a preselected coded grouping of pulses transmitted through said telephone line by said coded pulse transmitter to establish a momentary circuit closure for initiating energization of said timer mechanism with said independent source of electric power and for connecting said audible signal transmitter to said telephone line, said timer mechanism operating for shunting the circuit closure established by said selector switch for a period of timed duration whereby said timer mechanism is locked in energization with said independent power source and said transmitter remains connected to said telephone line for the duration of said timing period, and said timer mechanism further operating for connecting said first sounding means to said independent power source according to a preselected coded order during one portion of the timing period and for actuating said second sounding means for connection with said pump motor power source during a different portion of the timing period.

2. A control system for a pipe line adapted to transport fluid products having an unattended pump house equipped with a pump connected in said pipe line and driving means for said pump, a source of electric power for said driving means, a source of electric power independent of said pump motor power source, a control station geographically separated from said unattended pump house, and a two-wire telephone system including a two-wire telephone line connecting said control station and said unattended pump house, a coded pulse transmitter and a receiver for signals of audible frequency connected to said telephone line, said transmitter and said receiver being located in said control station, and a transmitter for audible signals located in said unattended pump house which control system comprises a first means for location in said unattended pump house and which produces a distinct sound, a second means for location in said unattended pump house and which produces a distinct sound differing from that produced by said first sounding means, a timer mechanism, and a selector means for connection to said telephone line responsive to a plurality of different preselected coded groupings of pulses transmitted through said telephone line by said coded pulse transmitter to establish a plurality of momentary circuit closures for selection of a first circuit closure initiating energization of said timer mechanism with said independent source of electric power, for connecting said audible signal transmitter to said telephone line and for connecting the remaining selectable circuit closures to pump house control function, said timer mechanism operating for shunting said first circuit closure established by said selector switch for a period of timed duration whereby said timer mechanism is locked in energization with said independent power source and said transmitter remains connected to said telephone line for the duration of said timing period, said timer mechanism further operating for connecting one of said sounding means to said independent power source according to a preselected coded order during one portion of the timing period and to actuate the other of said sounding means for connection with said pump motor power source during a different portion of the timing period.

References Cited in the file of this patent

UNITED STATES PATENTS

| | | |
|---|---|---|
| 1,600,358 | Puckette | Sept. 21, 1926 |
| 1,845,321 | Nelson | Feb. 16, 1932 |
| 1,905,256 | White | Apr. 25, 1933 |